United States Patent
Loce et al.

(10) Patent No.: US 9,965,687 B2
(45) Date of Patent: May 8, 2018

(54) SYSTEM AND METHOD FOR DETECTING POTENTIAL MUGGING EVENT VIA TRAJECTORY-BASED ANALYSIS

(71) Applicant: Conduent Business Services, LLC, Dallas, TX (US)

(72) Inventors: Robert P. Loce, Webster, NY (US); Wencheng Wu, Webster, NY (US); Edgar A. Bernal, Webster, NY (US); Michael C. Mongeon, Walworth, NY (US)

(73) Assignee: Conduent Business Services, LLC, Dallas, TX (US)

( * ) Notice: Subject to any disclaimer, the term of this patent is extended or adjusted under 35 U.S.C. 154(b) by 0 days. days.

(21) Appl. No.: 15/220,600

(22) Filed: Jul. 27, 2016

(65) Prior Publication Data
US 2018/0032817 A1 Feb. 1, 2018

(51) Int. Cl.
*G06K 9/00* (2006.01)
*G06K 9/62* (2006.01)
*G08B 13/196* (2006.01)

(52) U.S. Cl.
CPC ....... *G06K 9/00771* (2013.01); *G06K 9/6215* (2013.01); *G08B 13/19613* (2013.01)

(58) Field of Classification Search
CPC .............. G06K 9/00771; G06K 9/6215; G08B 13/19613
USPC ........................................................ 382/103
See application file for complete search history.

(56) References Cited

FOREIGN PATENT DOCUMENTS

WO    WO 2004045215 A1 * 5/2004 ......... G06K 9/00335

OTHER PUBLICATIONS

Oliver, Nuria M., Barbara Rosario, and Alex P. Pentland. "A Bayesian computer vision system for modeling human interactions." IEEE transactions on pattern analysis and machine intelligence 22.8 (2000): 831-843.*
U.S. Appl. No. 15/196,753, filed Jun. 29, 2016, Loce et al.
P. Felzenszwalb et al., "Object Detection with Discriminatively Trained Part Based Models," IEEE Transactions on Pattern Analysis and Machine Intelligence, vol. 32, No. 9, Sep. 2010.
Bertrand Luvison et al., (2011). Automatic Detection of Unexpected Events in Dense Areas for Videosurveillance Applications, Video Surveillance, Prof. Weiyao Lin (Ed.), ISBN: 978-953-307-436-8, InTech, DOI: 10.5772/1552-8. Available from: http://www.intechopen.com/books/video-surveillance/automatic-detection-of-unexpected-events-in-dense-areas-for-videosurveillance-applications.
C. Stauffer et al., "Adaptive background mixture models for real-time tracking," in Proc. IEEE Int. Conf. Comput. Vis. Pattern Recog., vol. 2, pp. 246-252, 1999.
T. Senst et al., "A decentralized privacy-sensitive video surveillance framework," in Proc. of 18th International Conference on DSP, 2013.
"Multi-Modal Situation Assessment & Analytics Platform," SEC-2010-2.3-3 Automatic Detection and Recognition of Threats to Critical Assets in Large Unpredictable Environments, Published by the MOSAIC Consortium Jun. 7, 2014.

* cited by examiner

*Primary Examiner* — Amandeep Saini
(74) *Attorney, Agent, or Firm* — Fay Sharpe LLP

(57) ABSTRACT

Disclosed is a method and system for detecting an interaction event between two or more objects in a surveillance area via the application of heuristics to trajectory representations of the static or dynamic movements associated with the objects. According to an exemplary embodiment, trajectory interaction features (TIFs) are extracted from the trajectory representations and heuristics are applied to the TIFs to determine if an interaction event has occurred, such as a potential mugging involving two or more pedestrians.

16 Claims, 11 Drawing Sheets

SYSTEM AND METHOD FOR DETECTING POTENTIAL MUGGING EVENT VIA TRAJECTORY-BASED ANALYSIS

CROSS REFERENCE TO RELATED PATENTS AND APPLICATIONS

U.S. patent application Ser. No. 15/196,753, filed Jun. 29, 2016, by Robert P. Loce et al., and entitled "METHOD AND SYSTEM FOR DETECTING THE OCCURRENCE OF AN INTERACTION EVENT VIA TRAJECTORY-BASED ANALYSIS" is incorporated herein by reference in its entirety.

BACKGROUND

This disclosure relates to image processing methods and systems for the detection of events including an interaction of two or more objects, such as, but not limited to, two or more pedestrians. More specifically, this disclosure, and the exemplary embodiments described herein, relates to the detection of potentially illegal activity involving two or more people, such as, but not limited to, a potential mugging event between two or more people and the notification of a central processing system or other party regarding the detected event.

Police and Public Safety data is growing at an astounding rate, and is expected to double every two years. Some data currently collected originates from a wide variety of sources, including the emergency telephone response system 911, CAD (Computer-Aided Dispatch), mobile, FBR (Field-Based Reporting), RMS (Record Management Sources), Jail, Radio, GPS (Global Positioning Systems) and other police and public safety systems. In addition, many cities have video camera surveillance systems which are manually monitored and/or accessed by personal after a crime has been committed or incident has occurred where further review of the crime or incident is necessary and/or warranted.

One currently available system offered by Xerox® and referred to as a Police Business Intelligence (PBI) system, is an information discovery tool for use with public safety agencies. PBI provides enhanced capabilities for data integration, analysis, visualization and distribution of information within and across agencies. PBI can assimilate data from all interconnected departments' databases as well as external sources to provide actionable insight for public safety commanders, allowing for rapid, fact-based decision making.

Provided herein are automated methods and systems for detecting an occurrence of an interaction event of two or more pedestrians using a video camera towards a surveilled area.

INCORPORATION BY REFERENCE

FELZENSZWALB et al., "Object Detection with Discriminatively Trained Part Based Models," IEEE Transactions on Pattern Analysis and Machine Intelligence, Vol. 32, No. 9, September 2010;
Bertrand LUVISON et al., (2011). Automatic Detection of Unexpected Events in Dense Areas for Videosurveillance Applications, Video Surveillance, Prof. Weiyao Lin (Ed.), ISBN: 978-953-307-436-8, InTech, DOI: 10.5772/15528. Available from: http://www.intechopen.com/books/video-surveillance/automatic-detection-of-unexpected-events-in-dense-areas-for-videosurveillance-applications;
C. STAUFFER et al., "Adaptive background mixture models for real-time tracking," in Proc. IEEE Int. Conf. Comput. Vis. Pattern Recog., vol. 2, pp. 246-252, 1999;
T. SENST et al., "A decentralized privacy-sensitive video surveillance framework," in Proc. of 18th International Conference on DSP, 2013; and
"Multi-Modal Situation Assessment & Analytics Platform," SEC-2010-2.3-3 Automatic Detection and Recognition of Threats to Critical Assets in Large Unpredictable Environments, Published by the MOSAIC Consortium Jun. 7, 2014, are incorporated herein by reference in their entirety.

BRIEF DESCRIPTION

In one embodiment of this disclosure, described is a computer-implemented method for automatically detecting an occurrence of a potential mugging interaction event associated with two or more people concurrently present in a surveilled area using a video camera directed towards the surveilled area, the method comprising: a) acquiring a video stream from the video camera, the video stream including a temporal sequence of video frames including the surveilled area within a FOV (field-of-view) associated with the video camera; b) detecting and tracking two or more people within a common temporal sequence of video frames included in the video stream, and generating a trajectory of each person tracked within the common temporal sequence of video frames; c) processing the trajectories of the tracked people to extract one or more trajectory interaction features (TIFs) associated with the trajectories of the two or more people tracked within the common temporal sequence of video frames; and d) applying predefined heuristics to the extracted TIFs to detect a potential mugging interaction event associated with the predefined heuristics has occurred involving at least two people of the two or more people tracked within the common temporal sequence of video frames.

In another embodiment of this disclosure, described is a video system for automatically detecting an occurrence of a potential mugging interaction event associated with two or more people concurrently present in a surveilled area comprising: a video camera with an associated FOV (field-of-view) directed towards the surveilled area; and a video processing system operatively associated with the video camera, the video processing system configured to: a) acquire a video stream from the video camera, the video stream including a temporal sequence of video frames including the surveilled area within the FOV associated with the video camera; b) detect and track two or more people within the common temporal sequence of video frames included in the video stream, and generate a trajectory of each person tracked within the common temporal sequence of video frames; c) process the trajectories of the tracked people to extract one or more trajectory interaction features (TIFs) associated with the trajectories of the two or more people tracked within the common temporal sequence of video frames; and d) apply predefined heuristics to the extracted TIFs to detect a potential mugging interaction event has occurred between at least two people of the two or more people tracked within the common temporal sequence of video frames.

In still another embodiment of this disclosure, described is a computer-implemented method for automatically detecting an interaction event involving two or more people concurrently present in a surveilled area using a video camera directed towards the surveilled, the method comprising: a) acquiring a video stream from the video camera, the video stream including a temporal sequence of video frames including the surveilled area within a FOV (field-of-view) associated with the video camera; b) detecting and tracking two or more people within a common temporal sequence of video frames included in the video stream, and generating a trajectory of each person tracked within the common temporal sequence of video frames; c) processing the trajectories of the tracked people to extract trajectory interaction features (TIFs) associated with the trajectories of the two or more people tracked within the common temporal sequence of video frames, the TIFs including a travel direction/orientation TIF associated with each of the two or more people, an acceleration TIF associated with each of the two or more people and a relative distance TIF associated with a relative distance between the two or more people; and d) applying predefined heuristics to the extracted TIFs to detect an interaction event associated with the predefined heuristics has occurred between at least two people of the two or more people tracked within the common temporal sequence of video frames.

BRIEF DESCRIPTION OF THE DRAWINGS

FIG. 5A illustrates pedestrian location TIFs for pedestrians P22 and P23, FIG. 5B illustrates a relative distance TIF, indicating the relative distance between pedestrians P22 and P23, FIG. 5C illustrates velocity TIFs for pedestrians P22 and P23, and FIG. 5D illustrates travel orientation/direction TIFs for pedestrians P22 and P23, according to an exemplary embodiment of this disclosure.

FIG. 6A illustrates pedestrian location TIFs for pedestrians P9 and P10, FIG. 6B illustrates a relative distance TIF, indicating the relative distance between pedestrians P9 and P10, FIG. 6C illustrates velocity TIFs for pedestrians P9 and P10, and FIG. 6D illustrates travel orientation/direction TIFs for pedestrians P9 and P10, according to an exemplary embodiment of this disclosure.

DETAILED DESCRIPTION

Figure 1:
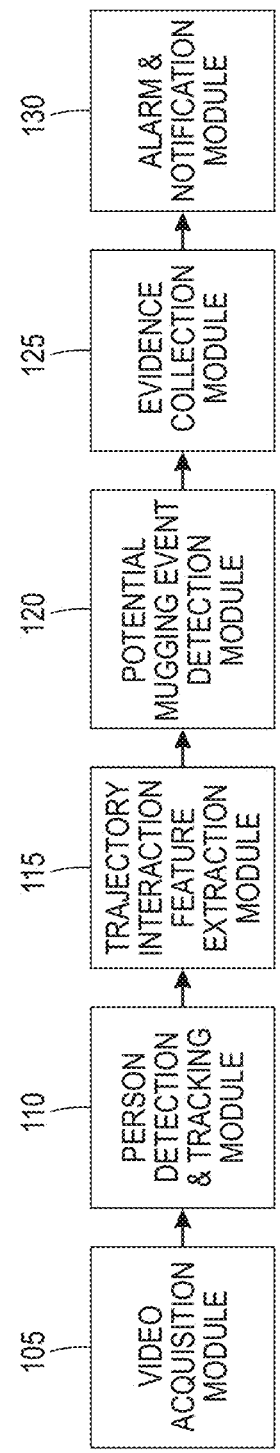
FIG. 1 is a diagram of a system for automatically detecting an occurrence of a potential interaction event associated with two or more people concurrently present in a surveilled area according to an exemplary embodiment of this disclosure.

The present disclosure provides a method and system for detecting event(s) including an interaction of two or more objects, such as, but not limited to, potential mugging activity involving two or more pedestrians via trajectory-based analysis. When supplied with proper camera calibration information or direct estimation of human heights/widths in pixels, this method can be applied effectively to surveillance videos ranging from near-field/mid-field view to far-field view. An exemplary embodiment of the disclosed system is shown in FIG. 1 and includes:

A Video Acquisition Module 105, which acquires video of a scene being surveilled;

A Person Detection and Tracking Module 110, which detects the presence of person(s), tracks him/her/them in the entire field of view or in pre-determined regions in the scene, and reports the (on-going) trajectory of tracked person(s);

A Trajectory Interaction Feature Extraction Module 115, which analyzes the trajectories of tracked persons and extracts trajectory interaction features (TIFs) from multiple trajectories that co-occur in the scene;

A Potential Mugging Activity Detection Module 120, which determines whether a potential mugging activity has occurred through rule-based analysis on the extracted TIFs;

An Evidence Collection Module 125, which collects the temporal evidence of detected potential mugging events to determine the probability or level of confidence that a mugging activity has occurred; and An Alarm and Notification Module 130, which alerts and notifies a central system or party of interest of the detected event.

A detailed description about each module and how they work together as a system to accomplish the detection of potential mugging events is presented below.

Video Acquisition Model (105)

Figure 2:
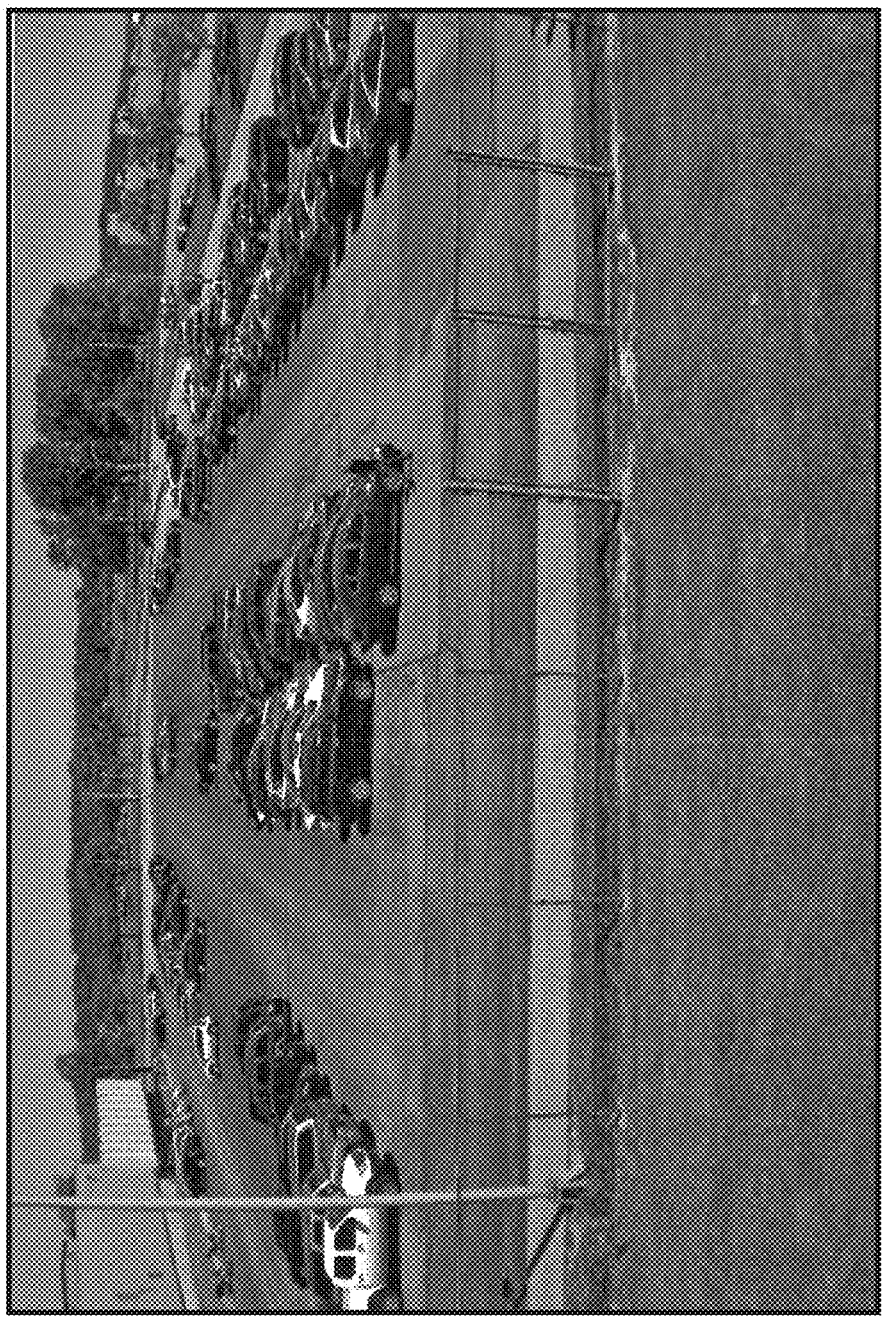
FIG. 2 is an example of an image captured of surveilled areas using a far FOV (field-of-view) video camera.

The Video Acquisition Module 105 includes a camera that acquires video of a scene being surveilled. It is to be understood that it is within the scope of this disclosure and the exemplary embodiments described herein that video and FOVs associated with the acquired video can include near-field/mid-field/overhead views, as well as other video and FOVs from various distances and perspectives. An example video frame of a field of view of a far-field view security camera is shown in FIG. 2. The acquired videos are streamed or archived and analyzed by the disclosed system to detect occurrences of potential mugging activity. The camera does not need to be specialized and can be a typical visible or NIR (Near-Infrared) video surveillance camera operating at conventional frame rates, for example as 15, 30 or 60 frames/sec and resolutions such as 1920×1080, 1280×1024, 1280×720, 1280×960, 1280×1024, 2048×1536, or 1108×832 pixels. The acquired videos can be streamed/streaming to the analysis modules discussed later to perform real-time or near real-time detection of potential mugging events (referred as on-line processing later). They can also be archived and transmitted to the analysis modules to perform detection of potential mugging events (referred as off-line processing).

A Person Detection and Tracking Module (110)

The Person Detection and Tracking Module 110 analyzes the acquired videos (on-line or off-line) and detects the presence of person(s), tracks him/her/them in the entire field of view or in pre-determined regions in the scene, and reports the (on-going) trajectory of tracked person(s). Generally, two different types of tracking can be implemented, either (a) multiple Single Object Tracking (SOT) algorithms, or (b) a single Multiple Object Tracker (MOT) algorithm can be used. See Shuangyan Yi, Zhenyu He, Xinge You, and Yiu-Ming Cheung, "Single object tracking via robust combination of particle filter and sparse representation," Signal Processing, Vol. 110, pp. 178-187, (2014); and Shunli Zhang, Sicong Zhao, Yao Sui, Li Zhang, "Single Object Tracking With Fuzzy Least Squares Support Vector Machine," IEEE Transactions on Image Processing, 2015, Volume: 24 Issue: 12, Pages: 5723-5738, herein fully incorporated, for additional information on SOT algorithms. See Chen-Chien Hsu, Yung-Ching Chu, and Ming-Chih Lu, "Hybrid multiple-object tracker incorporating Particle Swarm Optimization and Particle Filter," 2013 International Conference on System Science and Engineering (ICSSE), Pages: 189-193 and Hamed Moradi Pour and Saeid Fazli, "An Advanced Real-Time Multiple Object Tracker in Variant Outdoor Environments," J. Appl Computat Math 2012, vol 1, issue 5, herein fully incorporated, for additional information on MOT algorithms.

In the first case (multiple SOT), detection is performed once for each person, at which point a single object tracker is initialized. According to this approach, detection can be limited to specific regions of interest, which may include, for example, expected points of entrance into the field of view of the camera. Detection may be performed in different ways. Temporal differencing algorithms can detect objects in motion in the scene; alternatively, background subtraction, which requires the estimation of the stationary scene background, followed by subtraction of the estimated background from the current frame can detect foreground objects (which include objects in motion). The output of either approach is a binary mask with the same pixel dimensions as the input video, and having values equal to 0 where no motion/foreground objects are detected and values equal to 1 at pixel locations where motion/foreground objects are detected. This detection mask is usually post-processed via morphological operations which discard detected objects with size and orientation outside pre-determined ranges determined by the geometry of the capture. Alternatively, computer vision techniques for object recognition and localization can be used on still images (e.g., single video frames). These techniques typically entail a training stage where the appearance of multiple sample objects in a given feature space (e.g., Deep features, Harris Corners, SIFT, SURF, HOG, LBP, deep or learned features, etc.) is fed to a classifier (e.g., Neural Net, decision tree, SVM, EM, k-NN, clustering algorithms, etc.) that is trained on the available sample feature representations. The trained classifier is then applied to features extracted from frames of interest and outputs the parameters of bounding boxes (e.g., location, width and height) surrounding the matching candidates. Once a person has been detected, a SOT is assigned to the person. SOTs determine the location of the object being tracked by building appearance models of the image region where the detection was triggered, and finding candidate regions in subsequent frames with visual characteristics that best match the appearance of the initial detection. Examples of such trackers include template-based, mean-shift, particle filter, the circulant shift kernel (CSK), and the adaptive color attributes tracker. According to an exemplary embodiment of the algorithm, an adaptive color attributes tracker is used. However, the provided method and system is tracker-agnostic.

In the second scenario (single MOT), detection is performed on a frame-by-frame basis across the full field of view. Although the same detection techniques as described above can be used, and since an MOT algorithm continuously relies on monitoring the detections, motion-based detectors are not as well-suited to operate in this scenario. An MOT takes the full set of detections at each frame, and models detection errors and target motions to link detections with the most likely trajectories. In essence, an MOT solves a correspondence problem of the multiple detections across time.

The output of this module is a set of spatiotemporal sequences, one for each detected object, each describing the location, and possibly the size (in the form of a bounding box or a blob of connected pixels) of each of the people being tracked.

Trajectory Interaction Feature Extraction Module (115)

The Trajectory Interaction Feature Extraction Module 115 analyzes the trajectories of tracked persons (outputs from the Person Detection and Tracking Module 110) and extracts trajectory interaction features (TIFs) from multiple trajectories that co-occur in the scene. This module can be implemented in various forms (time-scales) depending on the applications and offerings. Described below are several options for this implementation.

Figure 3:
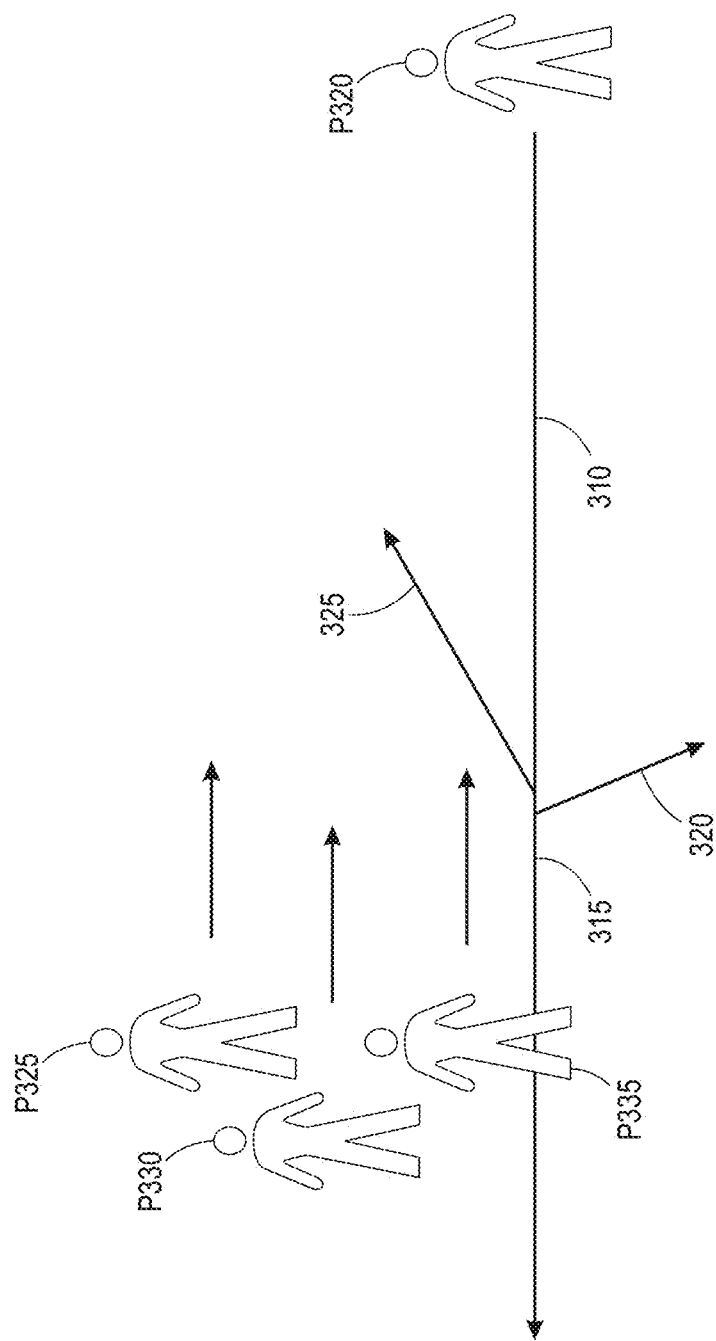
FIG. 3 is an illustration of an interaction event, i.e., a potential mugging event on/near a pedestrian walkway, from which heuristic rules are derived for operation on video-based trajectories associated with the pedestrians to detect the interaction event, according to an exemplary embodiment of this disclosure.

First, smoothing techniques are applied such as convolution, curve fitting, AR (Autoregressive), MA (Moving Average) or ARMA (Autoregressive-Moving-Average), etc., to smooth the tracked trajectories. The levels of smoothing depend on the performance/characteristics of the person tracker, and are application/module dependent. For the tracker used in our implementation, temporal smoothing over ~4 sec periods was sufficient. Many smoothing methods can work for this task. However, some may be more suited than others depending on the time-scale used in the module, which will be further discussed below. Note that smoothing significantly benefits the disclosed method and system because important features needed for this application are the velocities, accelerations, and travel orientation/direction of the persons involved as shown in FIG. 3 which depicts a potential mugging interaction event where pedestrians P325, P330 and P335 are walking and pedestrian P320 travels along path 310, interacts with one or more of pedestrians P325, P330 and P335, then pedestrian P320 moves on, traveling along path 315, or changes travel orientation/direction along paths 320, 325 depicted in FIG. 3. Small levels of noise in a trajectory can get amplified when using it to compute TIFs. Once the trajectories are smoothed, relevant features are extracted from the smoothed trajectories for later use. The activity of interest, illustrated in FIG. 3, involves at least two persons interacting with each other. Hence, relevant features must be extracted from single and multiple trajectories. In particular, temporal features extracted include individual position, individual velocity, acceleration, travel orientation/direction, and relative distances between persons of interest. These features can be extracted in an off-line or on-line manner, as described below, depending on the application, and these options affect several choices for implementing this module's algorithm.

Off-line operation: this assumes that the full trajectory has been extracted using the preceding module, i.e., the Person Detection and Tracking Module 110. In this scenario, simpler methods can be used for smoothing and feature extraction since all data is available at the time of processing. This, however, limits the usage of the disclosed method and system to after-the-fact alerts, e.g., for providing evidence in court or to notify authorities of a location or person(s) of interest. For smoothing, all methods mentioned above (e.g., curve fitting, convolution or AR) can be applied here. For feature extraction, using two trajectories as an example, let smoothed trajectory, $(i_t^A, j_t^A), t=t_S^A, \ldots, t_E^A$ correspond to person A; and smoothed trajectory, $(i_t^B, j_t^B), t=t_S^B, \ldots, t_E^B$ correspond to person B, where (i,j) are the row and column pixel coordinates, respectively, and t is time (or frame number), with S and E denoting start and end times, respectively, for a given person. In one embodiment, the Trajectory Interaction Features (TIFs) between A and B may be five temporal profiles of a length equal to the overlap time duration of their trajectories. In short, in this embodiment, the TIFs are the positions and velocities of both persons and the distance between them during the time periods that both are being tracked. For the case where two persons have never co-appeared in the videos, no further analysis is performed because the overlap time duration is zero. The overlap time duration and nine temporal profiles are expressed mathematically below.

Overlap time duration, $\min(t_E^A, t_E^B) - \max(t_S^A, t_S^A)$;

(TIF) position of person $A$ at time $t$, $p_t^A = (i_t^A, j_t^A)$;

(TIF) position of person $B$ at time $t$, $p_t^B = (i_t^B, j_t^B)$;

(TIF) velocity of person $A$ at time $t$, $v_t^A = \sqrt{(i_t^A - i_{t-1}^A)^2 + (j_t^A - j_{t-1}^A)^2}$;

(TIF) velocity of person $B$ at time $t$, $v_t^B = \sqrt{(i_t^B - i_{t-1}^B)^2 + (j_t^B - j_{t-1}^B)^2}$;

(TIF) travel orientation/direction of person $A$ at time $t$, $o_t^A = \tan^{-1}(i_t^A - i_{t-1}^A, j_t^A - j_{t-1}^A)$;

(TIF) travel orientation/direction of person $B$ at time $t$, $o_t^B = \tan^{-1}(i_t^B - i_{t-1}^B, j_t^B - j_{t-1}^B)$;

(TIF) acceleration of person $A$ at time $t$, $a_t^A = v_t^A - v_{t-1}^A$;

(TIF) acceleration of person $B$ at time $t$, $a_t^B = v_t^B - v_{t-1}^B$; and (TIF) relative distance between the persons at time $t$ $d_t^{AB} = \sqrt{(i_t^A - i_t^B)^2 + (j_t^A - j_t^B)^2}$.

Notably, in some embodiments, the outputs of the person detection and tracking module 110 may include the size (e.g., bounding box) of the detected person in addition to his/her position. In alternative embodiments, TIFs can be computed via more elaborate formulae. In one embodiment, instead of computing the TIF $d_t^{AB}$ using Euclidean distances between two points (the positions of person A and person B), TIF $d_t^{AB}$ can represent the "distance" between two regions (e.g., bounding boxes of A & B or blobs of A & B). According to this embodiment, TIF $d_t^{AB}$ can be computed as the minimal distance between two regions or minimal distance between two regions along a preselected direction (e.g., road plane). The benefit of this extended definition of distance is that it can take into account the pose (due to cameras or persons) of the objects. This is especially useful for near-field/mid-field views. In the case of far-field view, the bounding boxes of persons are typically small and either embodiment would work well.

Similarly, in some embodiments, the TIFs describing the velocity, acceleration, and travel orientation/direction of a person may be extended from point calculation to region calculation. As an example, instead of calculating velocity as the frame-to-frame positional change of centroids of the detected human blob, it can be estimated as a function (e.g., the average, weighted average, etc.) of the velocities of various part of the human blob (e.g., using optical flow calculation of the human blob frame-to-frame). This embodiment would be particularly efficient when the camera view is near-field/mid-field where it would be preferable to use the true velocity of person rather than the false velocity of the person coming from upper body movement. In such scenario, the average speed as estimated by the frame-to-frame displacement of the centroid of the detected human blob (centroids may move due to upper body movement) would not be as accurate as averaging velocities of various parts of the human.

Figure 4:
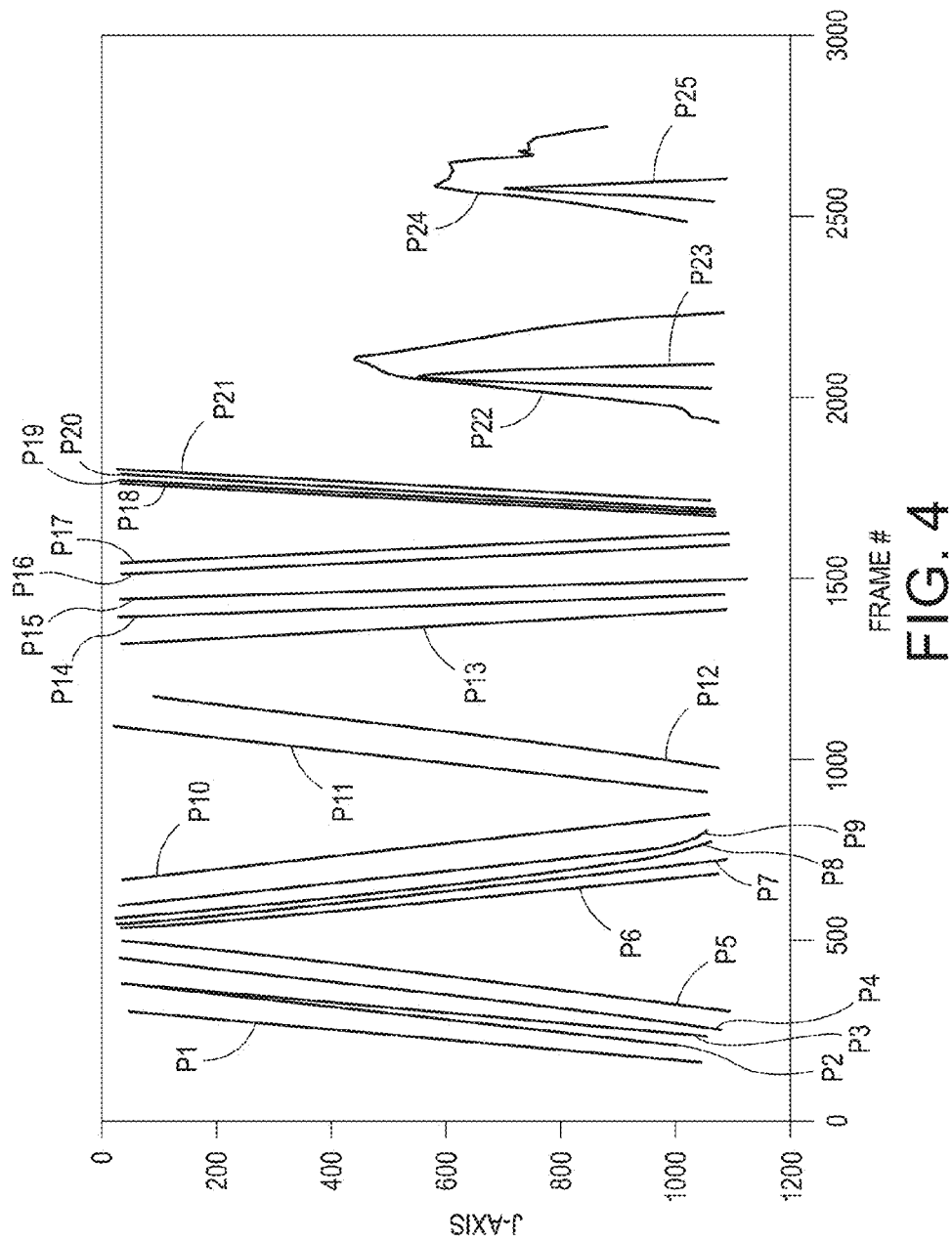
FIG. 4 is a plot of trajectories generated from far-field video, the plot graphs a j-axis representative of the pixel location of several pedestrians vs. a corresponding frame number of the processed video, according to an exemplary embodiment of this disclosure.

FIG. 4 graphically illustrates an analysis of the far-field video of the scene in FIG. 2. In FIG. 2 the pedestrian walkway is roughly aligned with the j axis shown in FIG. 4, so for simplicity plotted is the j coordinate of the trajectory of each person tracked as a function of time in FIG. 4, i.e., frame number. 7 pedestrians were tracked in this example where the pedestrians entered the scene from the right (high j). If they continued along the walk way they exit the scene with a low j value. Denoting the persons as P1-P25 in the graph, individually, the traces can be understood as follows:

Persons P1, P2, P3, P4, P5, P11, P12, P18, P19, P20, and P21 traveled continuously along the walkway without pause from the right (high j) to the left (low j).

Persons P6, P7, P8, P9, P13, P14, P15, P16, and P17 traveled continuously along the walkway without pause from the left (low j) to the right (high j).

Person P22 entered the scene from the right first (around frame 1900), then person P23 entered the scene from the right (around frame 2050), caught up with P22, turned around, and left the scene from the right (around frame 2100), and finally P22 turned around and left the scene from the right as well (around frame 2250).

Similarly, person P24 entered the scene from the right first (around frame 2450), then person P25 entered the scene from the right (around frame 2550), caught up with P24, turned around and left the scene from the right (around 2600), and finally P24 turned around, pausing twice, and left the scene from the right as well.

Figure 5A:
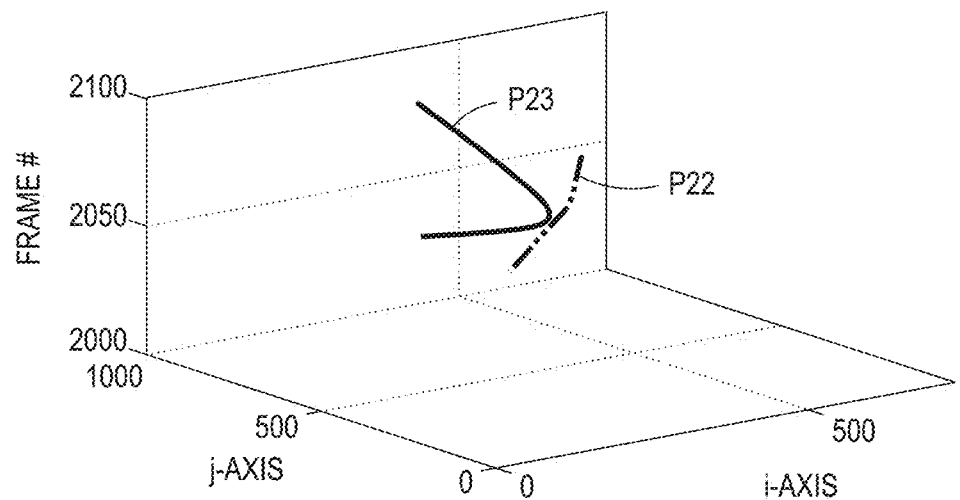
FIGS. 5A, 5B, 5C, and 5D are illustrations of trajectory interaction features (TIFs) generated for pedestrian P22 and P23 trajectories, shown in FIG. 4, indicating a probable mugging event, where
Figure 5B:
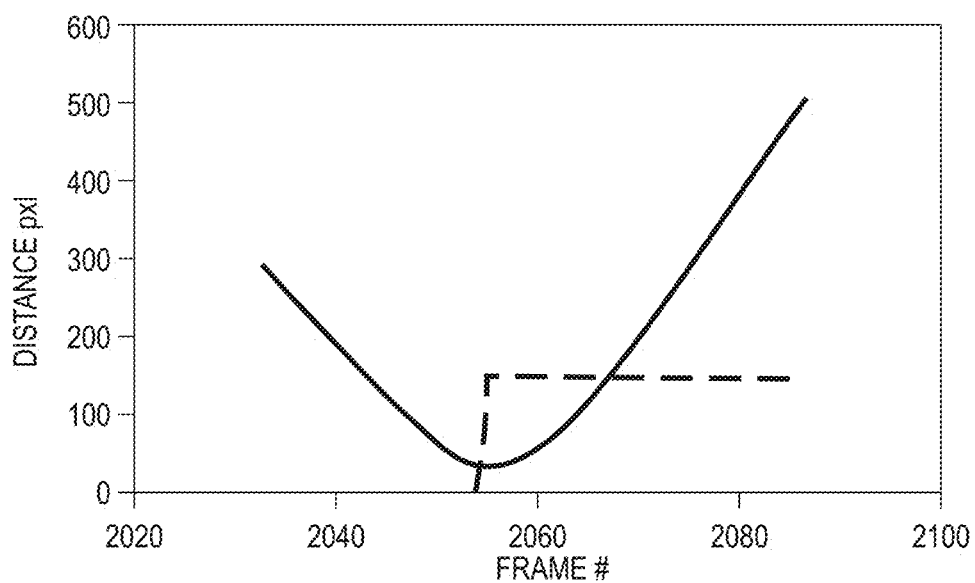
Figure 5C:
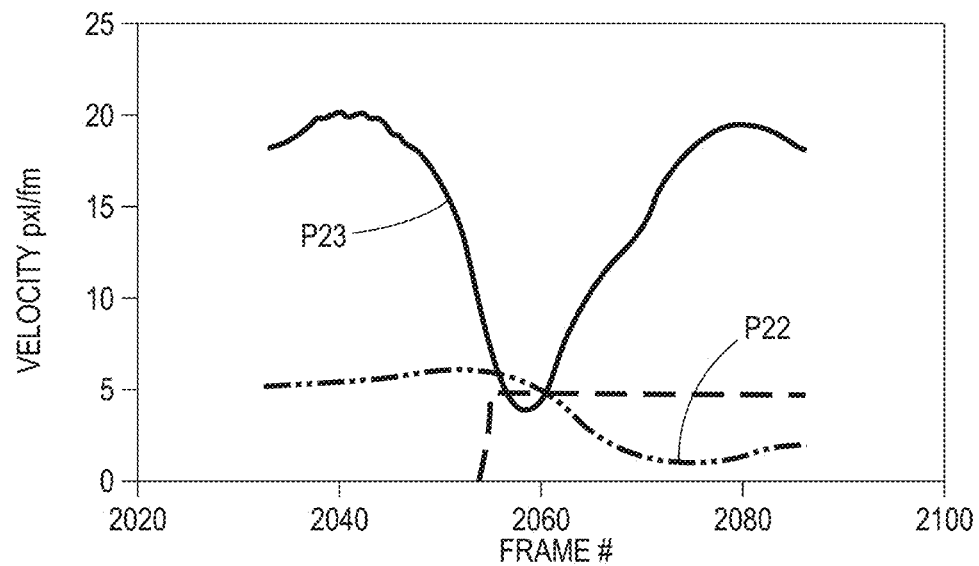
Figure 5D:
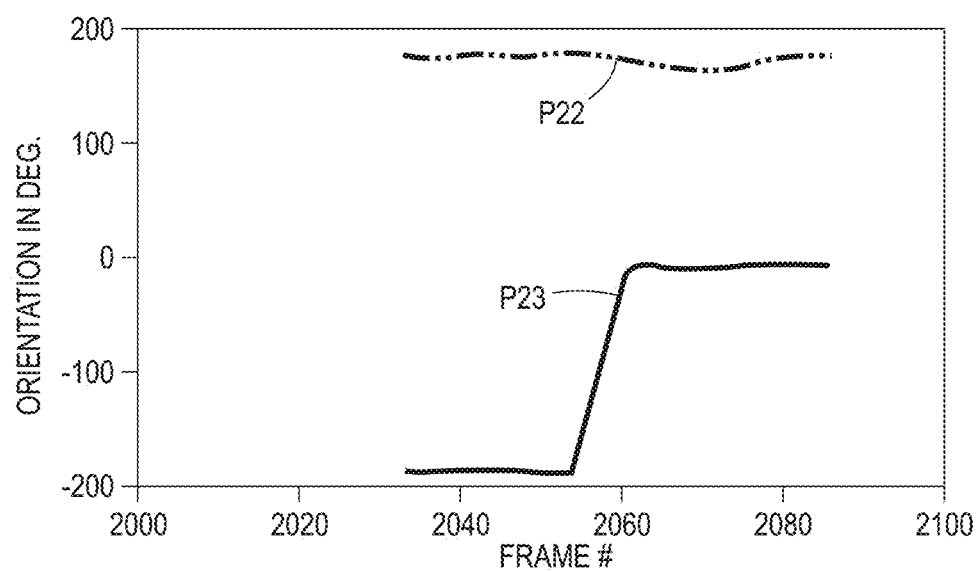

FIGS. 5A-5D show seven (out of nine) TIFs between person P22 (A) and person P23, which is referred to as B for understanding the TIFs and how they relate to recognizing a mugging event. FIG. 5A shows $p_t^A$ & $p_t^B$ plotted for their overlap time duration, roughly from frame 2025~2100. FIG. 5B shows the distance $d_t^{AB}$ between the pair as a function of time over the overlap duration time. It can be seen that for a period of time, roughly around frame 2050, they are quite close (<150 pixels away). FIG. 5C shows their velocities $v_t^A$ and $v_t^B$ where it is indicated that person P23 has the profile of run-to-stop (i.e., large velocity to small velocity) when reaching person P22 and then back to run again (i.e., small velocity to large velocity), while P22 has the profile of walk-to-nearly stationary afterward (i.e., small velocity to near zero velocity) for that overlap period of time. FIG. 5D shows their travel orientation/directions $o_t^A$ and $o_t^B$ where it is indicated that person P23 made a sharp (180°) turn around frame 2050 (when persons P22 and P23 interaction), while person P22 maintained their travel orientation for that overlap period of time. By comparing these metrics to the metrics of other pedestrians, it can be understood how they can be used to identify a mugging event.

Figure 6A:
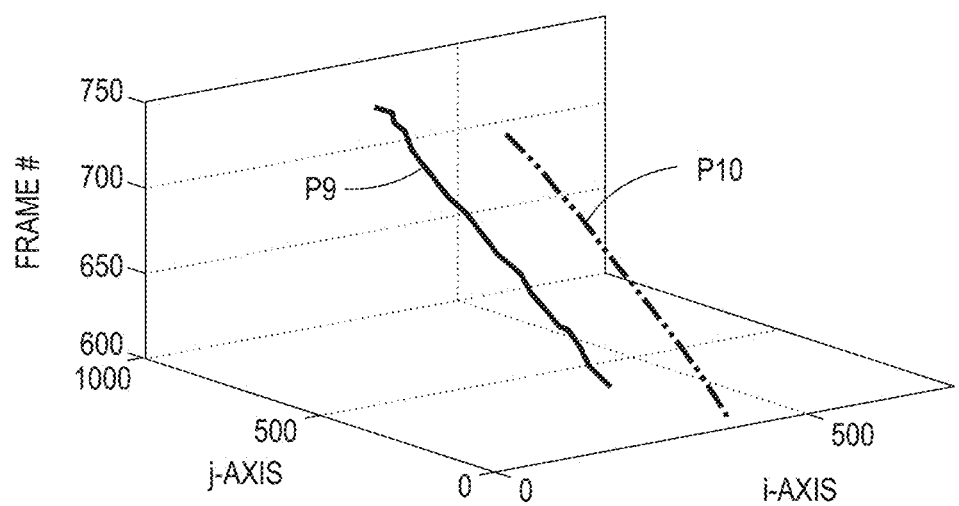
FIGS. 6A, 6B, 6C, and 6D are illustrations of TIFs generated for pedestrians P9 and P10 trajectories shown in FIG. 4, indicating a probable pair of pedestrians walking separately, where
Figure 6B:
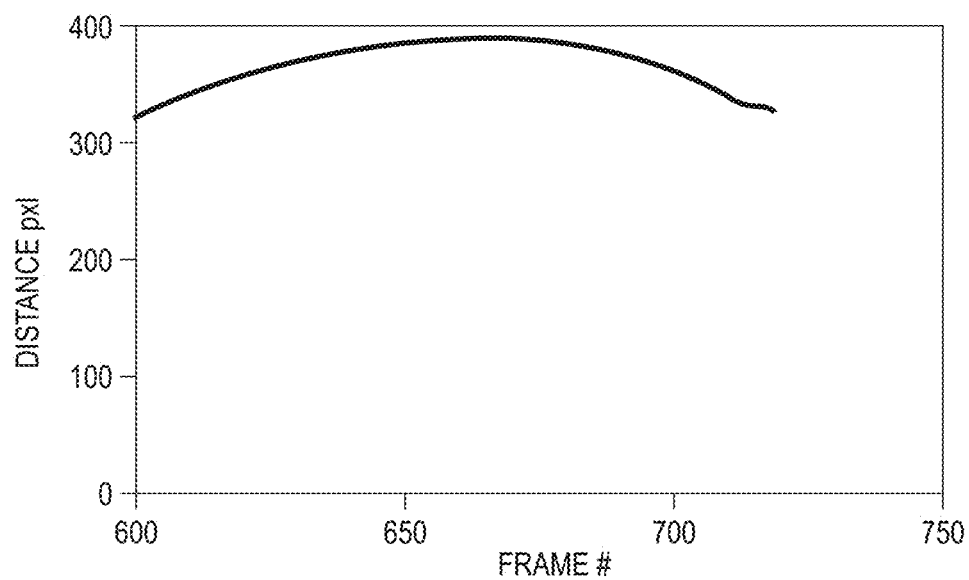
Figure 6C:
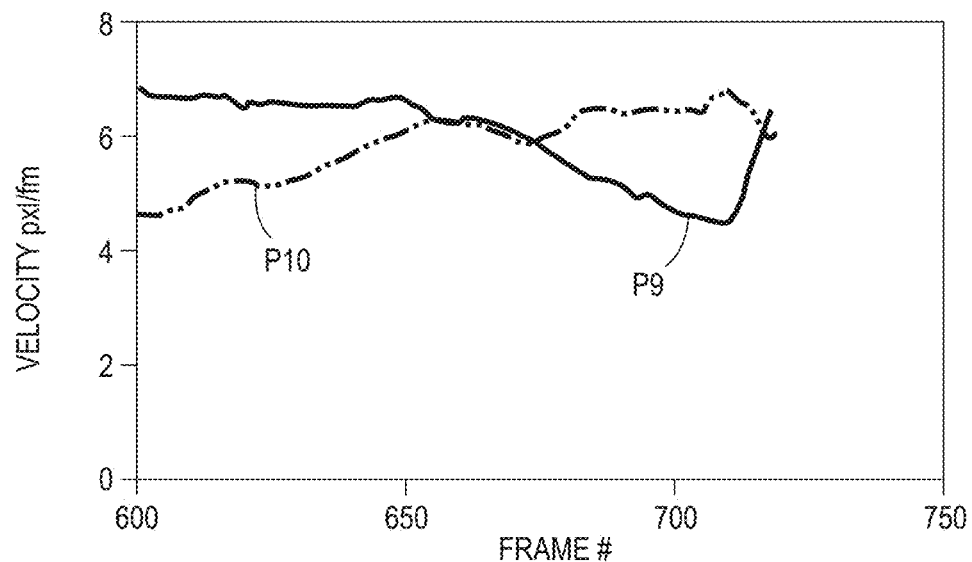
Figure 6D:
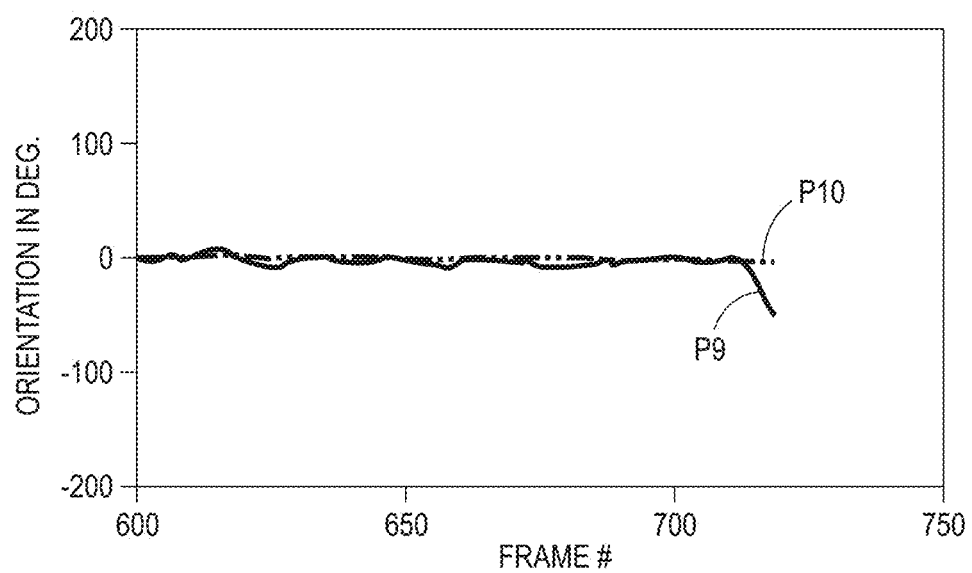

For comparison, consider FIGS. 6A-6D, which show the TIFs for person P9 and person P10 from FIG. 4. FIGS. 6A and 6B shows their position and relative distance TIFs, indicating that they stay in the range of 300 pixels from each other throughout their complete overlap time duration. FIG. 6C shows their velocity TIFs are between 4 and 7 pixels/frame during that time period. FIG. 6D shows that the travel directions of both person P9 and person P10 are almost the same without abrupt changes. All these metrics can be used to detect that this pair has the pattern of one following the other throughout the scene.

On-line operation: this assumes that videos are streaming into the disclosed system for continuous processing. In one embodiment where real-time person tracking can be achieved, the trajectories are received up to the current time. In this scenario, smoothing techniques such as AR or MA may be more suitable than curve fitting since these smoothing methods only require a small amount of buffering to store a small amount of recent data. For feature extraction, the process is the same as for the off-line operation with the exception that the length of the trajectory interaction features may change over time, growing in length as persons start to co-appear and eventually stop at the same length as the off-line operation once the interaction stops. Running the module on-line provides better offerings including both real-time alerts and after-the-fact alerts. However, the processing requirements are much higher and the algorithm has to be more conservative in collecting evidence before raising the alert.

A Potential Mugging Activity Detection Module (120)

The Potential Mugging Activity Detection Module 120 determines whether a potential mugging activity has occurred through heuristic rule-based analysis on the extracted trajectory interaction features (outputs from Module 115). The illustrations in FIGS. 5A-5D provide some intuition for the semantic rules needed to detect potential mugging activity: approaching, short-interaction/slow-down at proximity, fleeing or chasing. All three sub-actions can be detected from analyzing the nine temporal "trajectory interaction features" (TIFs) extracted from by the Trajectory Interaction Feature Extraction Module 115. Unlike detecting other events, such as a potential drug deal, as described in U.S. patent application Ser. No. 15/196,753, filed Jun. 29, 2016, by Robert P. Loce et al., and entitled "METHOD AND SYSTEM FOR DETECTING THE OCCURRENCE OF AN INTERACTION EVENT VIA TRAJECTORY-BASED ANALYSIS", the interactions and sub-actions used to detect a potential mugging are more fined-grained, and the combinations of sub-actions are more complex in mugging event detection. For example, the change in speed and/or change in travel direction/orientation, and the timing when that happens carry critical information of whether or not mugging activity has occurred. As a result, the rules to detect such events are more refined. According to a first exemplary implementation, the following rules are applied for detecting potential mugging activity:

Let $e_t^{AB}$, $t=\max(t_S^A+1,t_S^B+1)$, ..., $\min(T_E^A,t_E^B)$ be an evidence vector indicating that A and B are participating in a mugging action. Its state in time is determined by:

(1) Identifying the starting time, $T_{do}$, of closing proximity and significant change of travel direction:

$$T_{do}=\mathrm{argmin}_t(d_t^{AB}<\eta_d(FOV)\cap(\max(|o_t^A-o_{t-1}^A|,|o_t^B-o_{t-1}^B|>\eta_o)))$$

wherein $\eta_d(FOV)$ is the threshold for maximum distance allowed between A and B for considering them as in close proximity, $\eta_o$ is the threshold for minimal orientation changes for considering whether a person has made an abrupt change of travel direction; and (2) Confirming if at least one person increased speed or traveled at high speed afterward (i.e., when $t \geq T_{do}$):

$$e_t^{AB} = \begin{cases} 1 & \text{if } t \geq T_{do} \cap (\max(a_t^A, a_t^B) > \eta_a(FOV) \cup \max(v_t^A, v_t^B) > \eta_v(FOV)) \\ 0 & \text{otherwise} \end{cases},$$

wherein $\eta_a(FOV)$ is the threshold for minimal acceleration allowed for considering whether a person has made significant change of speed (i.e., running away), and $\eta_v(FOV)$ is the threshold for minimal velocity allowed for considering whether a person has traveled at high speed.

According to a second exemplary implementation, the Potential Mugging Activity Detection Module 120 determines whether a particular set of TIFs extracted from one or more trajectories meets a speed profile pattern of increase travel speed after short-slow-down at close encounter (e.g., walking, to "standing" at close proximity, to running), or a speed profile pattern of traveling at high speed after short-slow-down at close encounter (e.g., running, to "standing" at close proximity, to running).

Once the pattern of speed profile is verified, the module 120 may confirm whether the timing when the speed changes coincides with the timing of close proximity, which would potentially indicate the detection of a mugging event. Alternatively, the module 120 may start by identifying the time when two trajectories are at close proximity, and then assess the speed profiles around (before and after) the identified time to see if speed patterns discussed above are observed.

In one embodiment according to the second exemplary implementation, the module 120 may:

(1) segment the time axis within the overlap time period into regions of "close proximity (CP)", $d_t^{AB}<\eta_d(FOV)$, and "not close proximity (NCP)". Some filtering may be applied to remove abrupt switches between the two regions due to noise;

(2) if a section of NCP-CP-NCP is found, compute the average speeds for person A and person B at each region within the NCP-CP-NCP segment; (Notably, of interest in only the average speeds of CP and speeds around that time, therefore, some data in both sides of NCP can be removed in the calculations); and (3) use the relative difference between those average speeds in NCP-CP-NCP to determine if person A or person B meets the speed profile patterns described above. If the answer is yes, let $T_{CP}$ be the starting time of the CP region and $T_{NCP}$ be the ending time of the later NCP region, then $$e_t^{AB} = \begin{cases} 1 & \text{if } T_{CP} \leq t \leq T_{NCP} \\ 0 & \text{otherwise} \end{cases}.$$

According to the second exemplary implementation, it may be beneficial to use the amount of change in speed upon close encounter as a measure of confidence.

According to both of these embodiments, $e_t^{AB}=1$ is interpreted in the Evidence Collection Module 125 described below as evidence supporting that a mugging action has occurred. The vector may be post processed with additional temporal filtering such as median filtering to remove detection of low confidence events. Note the evidence vector dependency on the velocity threshold $\eta_v$ and the proximity threshold $\eta_d$ on the Field Of View (FOV). The algorithm needs to comprehend that dependence in order to be robust across various fields of view in practice. One solution for this is to perform camera calibration in the field for all the cameras and operate the disclosed trajectory analysis in physical units. Alternatively, simple approximation can be done without camera calibration due to information acquired as the system detects and tracks persons. The collected sizes of tracked humans (e.g., heights or widths) can be used as a simple surrogate for adjusting thresholds from one camera view to another.

Although a simple heuristic rule of setting lower bounds to velocity and distance among persons of interest works well, other rules can be applied or adapted over time.

An Evidence Collection Module (125)

The Evidence Collection Module 125 collects the temporal evidences of detected potential mugging events (outputs from Module 120) to support later use. In one exemplary embodiment, evidence is collected as follows. From the previous Event Detection Module 120, the Evidence Module 125 will store or "mark" those frames with an indicator where the detected mugging event occurred. In another embodiment, the Evidence Module 125 will track persons involved and store their "identity", including image data around the bounding boxes of the persons. In further embodiments, the Evidence Module 125 may also classify the mugger and "muggee" based on one or more of the nine TIFs and their relationship via the rules, such as, which person makes the abrupt change of travel direction first, or which person initiates the abrupt change of speed. In additional embodiments, the Evidence Module 125 will collect one or more of the extracted TIFs associated with the trajectories of the two or more people within the common temporal sequence of video frames, a time duration and start/end time associated with the detected interaction event, and a calculated probability of the occurrence of the interaction event.

Alarm and Notification Module (130)

The Alarm and Notification Module 130 alerts and notifies a central system or party of interest of the detected event when a mugging activity has been detected. The information collected in the evidence collection module 125 may also be included in the alert. Appropriate actions are taken based on the application.

Experimental Results

An exemplary embodiment of the disclosed method and system was implemented and tested on videos acquired from a surveillance system. A mix of simulated mugging events and other irrelevant activities of people walking or running were contained in the test video acquired. The velocity threshold $\eta_v$, and the proximity threshold $\eta_d$ was 5 pixels/frame and 150 pixels, respectively; while the acceleration threshold $\eta_a$ and travel direction/orientation change threshold $\eta_o$ are 0 and 10 degrees/frame, respectively. While pixel units are used here, physical units based on camera calibration are also acceptable for specifying the thresholds.

Figure 7A:
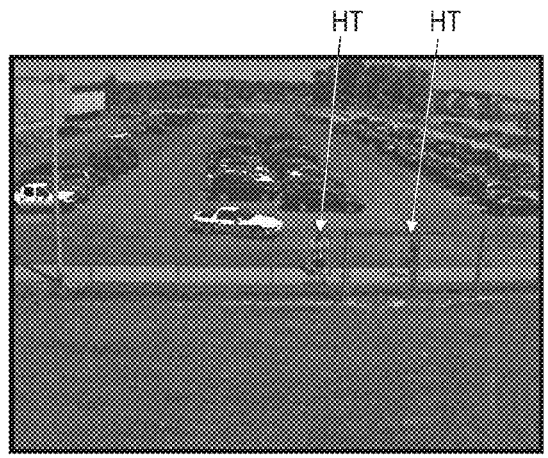
FIGS. 7A, 7B, and 7C are examples of processed far-field video, according to an exemplary embodiment of this disclosure, detecting a potential mugging event and labeling the relevant video frame(s) where the event occurred.
Figure 7B:
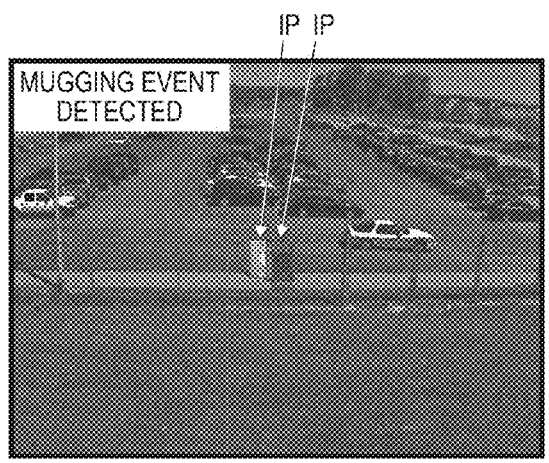
Figure 7C:
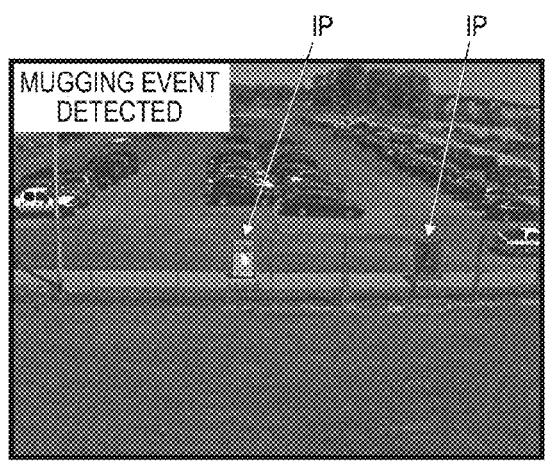

FIGS. 7A-7C show examples of how videos analyzed were marked automatically by the exemplary embodiment of the disclosed method and system. It shows three sample frames: approaching (FIG. 7A), mugging in progress (FIG. 7B), and leaving (FIG. 7C), in the process of mugging activities for collected video. Note that the boxes HT indicate bounding boxes provided by the human tracker. If the mugging detection module 125 detects a mugging, i.e., the time when $e_t^{AB} \neq 0$, a label "Mugging event detected" will be labeled on the upper left corner of the image frame. Additionally, the bounding boxes for those persons involved in the detected event will be filled with the color white (not shown) if the person is classified as the "muggee" or red (not shown) if the person is classified as the mugger, and/or identified with "IP" indicating they were an involved person. After the action is no longer detected, i.e., the time when $e_t^{AB}=0$, the bounding boxes of tacked persons are again identified by HT, or, in other embodiments, turn back to blue (not shown) without filled color.

For illustrative purposes, the individual trajectories are also classified and labeled as "stand", "walk", or "run" based on simple thresholding on its velocity (0~2.5 pixels/frame, 2.5~10 pixels/frame, more than 10 pixels/frame).

Note that in this embodiment, a mugging event is detected through pair-wise TIFs. It can be easily extended to analyses on trajectories involving three or more persons. The implementation described here classifies individual action to "stand", "walk" or "run".

Figure 8A:
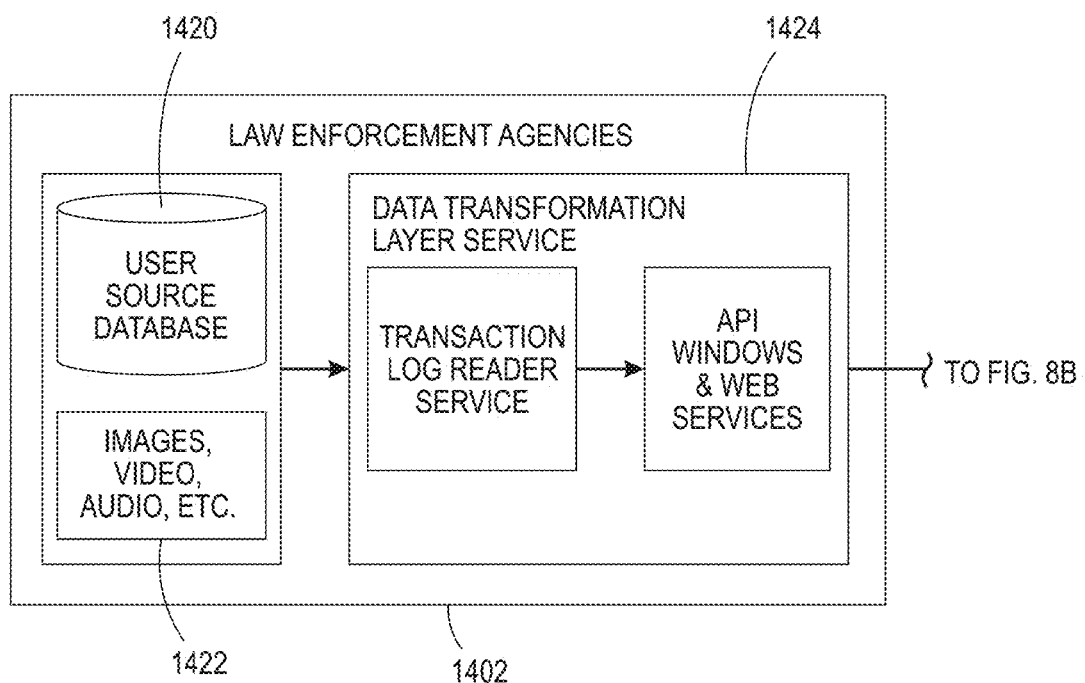
FIGS. 8A and 8B are a system diagram of a Police Business Intelligence (PBI) System including an Event Detection Module incorporating interaction event detection according to an exemplary embodiment of this disclosure.
Figure 8B:
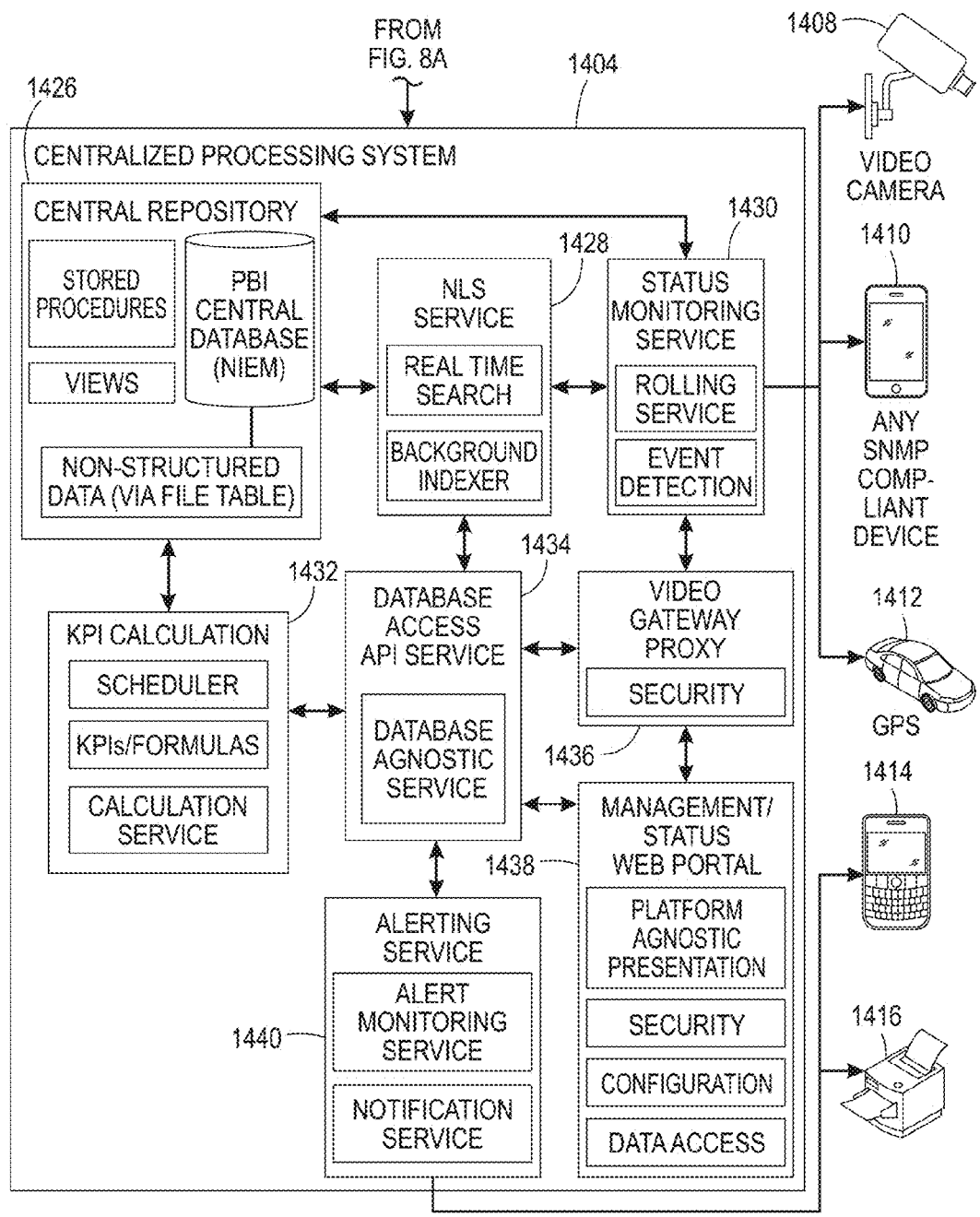

With reference to FIGS. 8A and 8B, provided is a system diagram of a Police Business Intelligence (PBI) system including an Event Detection Module incorporating event detection according to an exemplary embodiment of this disclosure. This system is provided to illustrate a manner of incorporating a method for automatically detecting an occurrence of an interaction event, such as a potential mugging, including two or more people as described herein, into a central processing system for use with a central public safety and/or law enforcement system.

The PBI system includes a Centralized Processing System 1404 which is operatively connected to Law Enforcement Agencies 1402, one or more Video Cameras 1408, SNMP Compliant Devices 1410, Vehicle GPSs 1412, Mobile Communication Devices 1414 and a Printer 1416.

The Central Processing System includes a Central Repository Module 1426, a NLS (National Library Service) Module 1428, KPI (Key Performance Indicator) Calculation Module 1432, A Database Access Module 1434, Alerting Service Module 1440, a Status Monitoring Module 1430, a Video Gateway Proxy Module 1436 and a Management/Status Web Portal Module 1438. The Status Monitoring Module 1430 includes the processing of video acquired from one or more Video Cameras 1408 to detect an occurrence of an interaction event of two or more people, such as a potential mugging, as previously described.

The Law Enforcement Agency Module 1402 includes a User Source Database 1420, Images/Video/Audio Database 1422 and Data Transformation Layer Service Module 1424.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer-implemented method for automatically detecting an occurrence of a potential mugging interaction event associated with two or more people concurrently present in a surveilled area using a video camera directed towards the surveilled area, the method comprising:
    a) acquiring a video stream from the video camera, the video stream including a temporal sequence of video frames including the surveilled area within a FOV (field-of-view) associated with the video camera;
    b) detecting and tracking two or more people within a common temporal sequence of video frames included in the video stream, and generating a trajectory of each person tracked within the common temporal sequence of video frames;
    c) processing the trajectories of the tracked people to extract one or more trajectory interaction features (TIFs) associated with the trajectories of the two or more people tracked within the common temporal sequence of video frames,
    wherein the TIFs include one or more of a position, a velocity, a travel orientation/direction, an acceleration, and a relative distance associated with the two or more people within the common temporal sequence of video frames; and,
    d) applying predefined heuristics to the extracted TIFs to detect a potential mugging interaction event associated with the predefined heuristics has occurred involving at least two people of the two or more people tracked within the common temporal sequence of video frames,
    wherein the predefined heuristics include the calculation of an evidence vector state, the evidence vector state calculated as a function of a proximity threshold, a change of travel orientation/direction threshold, an acceleration threshold, and a velocity threshold associated with the two or more people tracked within the common temporal sequence of video frames.

2. The computer-implemented method for automatically detecting the occurrence of a potential mugging interaction event associated with two or more people according to claim 1, further comprising:
    e) collecting evidence of the detected potential mugging interaction event in step d), the evidence including one or more of the common temporal sequence of video frames, an indicator associated with the common temporal sequence of video frames, one or more of extracted TIFs associated with the trajectories of the two or more people within the common temporal sequence of video frames, a time duration and start/end time associated with the detected potential mugging interaction event, a calculated probability of the occurrence of the potential mugging interaction event, and a classification of at least one of the two or more people within the common temporal sequence of video frames.

3. The computer-implemented method for automatically detecting the occurrence of a potential mugging interaction event associated with two or more people according to claim 2, further comprising:

f) communicating an alert to an operatively associated central system, the alert indicating one or more of the common temporal sequence of video frames, an indicator associated with the common temporal sequence of video frames, one or more of extracted TIFs associated with the trajectories of the two or more people within the common temporal sequence of video frames, the time duration and start/end time associated with the detected potential mugging interaction event, the calculated probability of the occurrence of the potential mugging interaction event, and the classification of at least one of the two or more people within the common temporal sequence of video frames.

4. A computer-implemented method for automatically detecting the occurrence of a potential mugging interaction event associated with two or more people concurrently present in a surveilled area using a video camera directed towards the surveilled area, the method comprising:
  a) acquiring a video stream from the video camera, the video stream including a temporal sequence of video frames including the surveilled area within a FOV (field-of-view) associated with the video camera;
  b) detecting and tracking two or more people within a common temporal sequence of video frames included in the video stream, and generating a trajectory of each person tracked within the common temporal sequence of video frames;
  c) processing the trajectories of the tracked people to extract one or more trajectory interaction features (TIFs) associated with the trajectories of the two or more people tracked within the common temporal sequence of video frames; and
  d) applying predefined heuristics to the extracted TIFs to detect a potential mugging interaction event associated with the predefined heuristics has occurred involving at least two people of the two or more people tracked within the common temporal sequence of video frames,
  wherein the predefined heuristics detect the potential mugging interaction event has occurred if the two or more people tracked are within a predefined proximity threshold relative to each other, at least one of the two or more people in proximity change a travel direction by a predefined change of travel orientation/direction, and at least one of the two or more people increase travel speed by a predefined travel speed threshold subsequent to being within the predefined proximity threshold relative.

5. A computer-implemented method for automatically detecting the occurrence of a potential mugging interaction event associated with two or more people concurrently present in a surveilled area using a video camera directed towards the surveilled area, the method comprising:
  a) acquiring a video stream from the video camera, the video stream including a temporal sequence of video frames including the surveilled area within a FOV (field-of-view) associated with the video camera;
  b) detecting and tracking two or more people within a common temporal sequence of video frames included in the video stream, and generating a trajectory of each person tracked within the common temporal sequence of video frames;
  c) processing the trajectories of the tracked people to extract one or more trajectory interaction features (TIFs) associated with the trajectories of the two or more people tracked within the common temporal sequence of video frames; and
  d) applying predefined heuristics to the extracted TIFs to detect a potential mugging interaction event associated with the predefined heuristics has occurred involving at least two people of the two or more people tracked within the common temporal sequence of video frames,
  wherein the predefined heuristics detect the potential mugging interaction event has occurred if the two or more people tracked are within a predefined proximity threshold relative to each other and a speed profile pattern associated with at least one of the people tracked indicates an increase of travel speed above a predetermined speed threshold after a relatively short duration speed slow down within the predefined proximity threshold.

6. A video system for automatically detecting an occurrence of a potential mugging interaction event associated with two or more people concurrently present in a surveilled area comprising:
  a video camera with an associated FOV (field-of-view) directed towards the surveilled area; and
  a video processing system operatively associated with the video camera, the video processing system configured to:
    a) acquire a video stream from the video camera, the video stream including a temporal sequence of video frames including the surveilled area within the FOV associated with the video camera;
    b) detect and track two or more people within the common temporal sequence of video frames included in the video stream, and generate a trajectory of each person tracked within the common temporal sequence of video frames;
    c) process the trajectories of the tracked people to extract one or more trajectory interaction features (TIFs) associated with the trajectories of the two or more people tracked within the common temporal sequence of video frames,
  wherein the TIFs include one or more of a position, a velocity, a travel orientation/direction, an acceleration, and a relative distance associated with the two or more people within the common temporal sequence of video frames; and
    d) apply predefined heuristics to the extracted TIFs to detect a potential mugging interaction event has occurred between at least two people of the two or more people tracked within the common temporal sequence of video frames,
  wherein the predefined heuristics applied in step d) include the calculation of an evidence vector state, the evidence vector state calculated as a function of a proximity threshold, a change of travel orientation/direction threshold, an acceleration threshold, and a velocity threshold associated with the two or more people tracked within the common temporal sequence of video frames.

7. The video system for automatically detecting the occurrence of a potential mugging interaction event associated with two or more people according to claim 6, further comprising the video processing system configured to:
  e) collect evidence of the detected interaction event in step d), the evidence including one or more of the common temporal sequence of video frames, an indicator associated with the common temporal sequence of video frames, one or more of extracted TIFs associated with the trajectories of the two or more people within the common temporal sequence of video frames, a time duration and start/end time associated with the detected potential mugging interaction event, a calculated probability of the occurrence of the potential mugging interaction event, and a classification of at least one of the two or more people within the common temporal sequence of video frames.

8. The video system for automatically detecting the occurrence of a potential mugging interaction event associated with two or more people according to claim 7, further comprising the video processing system configured to:
    f) communicate an alert to an operatively associated central system, the alert indicating one or more of the common temporal sequence of video frames, an indicator associated with the common temporal sequence of video frames, one or more of extracted TIFs associated with the trajectories of the two or more people within the common temporal sequence of video frames, the time duration and start/end time associated with the detected potential mugging interaction event, the calculated probability of the occurrence of the potential mugging interaction event, and the classification of at least one of the two or more people within the common temporal sequence of video frames.

9. A video system for automatically detecting the occurrence of a potential mugging interaction event associated with two or more people concurrently present in a surveilled area comprising:
    a video camera with an associated FOV (field-of-view) directed towards the surveilled area; and
    a video processing system operatively associated with the video camera, the video processing system configured to:
       a) acquire a video stream from the video camera, the video stream including a temporal sequence of video frames including the surveilled area within the FOV associated with the video camera;
       b) detect and track two or more people within the common temporal sequence of video frames included in the video stream, and generate a trajectory of each person tracked within the common temporal sequence of video frames;
       c) process the trajectories of the tracked people to extract one or more trajectory interaction features (TIFs) associated with the trajectories of the two or more people tracked within the common temporal sequence of video frames, and
       d) apply predefined heuristics to the extracted TIFs to detect a potential mugging interaction event has occurred between at least two people of the two or more people tracked within the common temporal sequence of video frames,
    wherein the predefined heuristics detect the potential mugging interaction event has occurred if the two or more people tracked are within a predefined proximity threshold relative to each other, at least one of the two or more people in proximity change a travel direction by a predefined change of travel orientation/direction, and at least one of the two or more people increases travel speed by a predefined travel speed threshold subsequent to being within the predefined proximity threshold relative.

10. A video system for automatically detecting the occurrence of a potential mugging interaction event associated with two or more people concurrently present in a surveilled area comprising:
    a video camera with an associated FOV (field-of-view) directed towards the surveilled area; and
    a video processing system operatively associated with the video camera, the video processing system configured to:
       a) acquire a video stream from the video camera, the video stream including a temporal sequence of video frames including the surveilled area within the FOV associated with the video camera;
       b) detect and track two or more people within the common temporal sequence of video frames included in the video stream, and generate a trajectory of each person tracked within the common temporal sequence of video frames;
       c) process the trajectories of the tracked people to extract one or more trajectory interaction features (TIFs) associated with the trajectories of the two or more people tracked within the common temporal sequence of video frames, and
       d) apply predefined heuristics to the extracted TIFs to detect a potential mugging interaction event has occurred between at least two people of the two or more people tracked within the common temporal sequence of video frames,
    wherein the predefined heuristics detect the potential mugging interaction event has occurred if the two or more people tracked are within a predefined proximity threshold relative to each other and a speed profile pattern associated with at least one of the people tracked indicates an increase of travel speed above a predetermined speed threshold after a relatively short duration speed slow down within the predefined proximity threshold.

11. A computer-implemented method for automatically detecting an interaction event involving two or more people concurrently present in a surveilled area using a video camera directed towards the surveilled, the method comprising:
    a) acquiring a video stream from the video camera, the video stream including a temporal sequence of video frames including the surveilled area within a FOV (field-of-view) associated with the video camera;
    b) detecting and tracking two or more people within a common temporal sequence of video frames included in the video stream, and generating a trajectory of each person tracked within the common temporal sequence of video frames;
    c) processing the trajectories of the tracked people to extract trajectory interaction features (TIFs) associated with the trajectories of the two or more people tracked within the common temporal sequence of video frames, the TIFs including a travel direction/orientation TIF associated with each of the two or more people, an acceleration TIF associated with each of, the two or more people and a relative distance TIF associated with a relative distance between the two or more people; and
    d) applying predefined heuristics to the extracted TIFs to detect an interaction event associated with the predefined heuristics has occurred between at least two people of the two or more people tracked within the common temporal sequence of video frames,
    wherein the predefined heuristics include the calculation of an evidence vector state, the evidence vector state calculated as a function of a proximity threshold, a change of travel orientation/direction threshold, an acceleration threshold, and a velocity threshold associated with the two or more people tracked within the common temporal sequence of video frames.

12. The computer-implemented method for automatically detecting an interaction event according to claim 11, wherein the interaction event is a potential mugging involving at least two of the two or more people.

13. The computer-implemented method for automatically detecting the occurrence of an interaction event associated with two or more people according to claim 12, further comprising:
  e) collecting evidence of the detected potential mugging interaction event in step d), the evidence including one or more of the common temporal sequence of video frames, an indicator associated with the common temporal sequence of video frames, one or more of extracted TIFs associated with the trajectories of the two or more people within the common temporal sequence of video frames, a time duration and start/end time associated with the detected potential mugging interaction event, a calculated probability of the occurrence of the potential mugging interaction event, and a classification of at least one of the two or more people within the common temporal sequence of video frames.

14. The computer-implemented method for automatically detecting the occurrence of an interaction event associated with two or more people according to claim 13, further comprising:
  f) communicating an alert to an operatively associated central system, the alert indicating one or more of the common temporal sequence of video frames, an indicator associated with the common temporal sequence of video frames, one or more of extracted TIFs associated with the trajectories of the two or more people within the common temporal sequence of video frames, the time duration and start/end time associated with the detected potential mugging interaction event, the calculated probability of the occurrence of the potential mugging interaction event, and the classification of at least one of the two or more people within the common temporal sequence of video frames.

15. A computer-implemented method for automatically detecting an interaction event involving two or more people concurrently present in a surveilled area using a video camera directed towards the surveilled, wherein the interaction event is a potential mugging involving at least two of the two or more people, the method comprising:
  a) acquiring a video stream from the video camera, the video stream including a temporal sequence of video frames including the surveilled area within a FOV (field-of-view) associated with the video camera;
  b) detecting and tracking two or more people within a common temporal sequence of video frames included in the video stream, and generating a trajectory of each person tracked within the common temporal sequence of video frames;
  c) processing the trajectories of the tracked people to extract trajectory interaction features (TIFs) associated with the trajectories of the two or more people tracked within the common temporal sequence of video frames, the TIFs including a travel direction/orientation TIF associated with each of the two or more people, an acceleration TIF associated with each of the two or more people and a relative distance TIF associated with a relative distance between the two or more people; and
  d) applying predefined heuristics to the extracted TIFs to detect an interaction event associated with the predefined heuristics has occurred between at least two people of the two or more people tracked within the common temporal sequence of video frames,
  wherein the predefined heuristics detect the potential mugging interaction event has occurred if the two or more people tracked are within a predefined proximity threshold relative to each other, at least one of the two or more people in proximity change a travel direction by a predefined change of travel orientation/direction, and at least one of the two or more people increases travel speed by a predefined travel speed threshold subsequent to being within the predefined proximity threshold relative.

16. A computer-implemented method for automatically detecting an interaction event involving two or more people concurrently present in a surveilled area using a video camera directed towards the surveilled, wherein the interaction event is a potential mugging involving at least two of the two or more people, the method comprising:
  a) acquiring a video stream from the video camera, the video stream including a temporal sequence of video frames including the surveilled area within a FOV (field-of-view) associated with the video camera;
  b) detecting and tracking two or more people within a common temporal sequence of video frames included in the video stream, and generating a trajectory of each person tracked within the common temporal sequence of video frames;
  c) processing the trajectories of the tracked people to extract trajectory interaction features (TIFs) associated with the trajectories of the two or more people tracked within the common temporal sequence of video frames, the TIFs including a travel direction/orientation TIF associated with each of the two or more people, an acceleration TIF associated with each of the two or more people and a relative distance TIF associated with a relative distance between the two or more people; and
  d) applying predefined heuristics to the extracted TIFs to detect an interaction event associated with the predefined heuristics has occurred between at least two people of the two or more people tracked within the common temporal sequence of video frames,
  wherein the predefined heuristics detect the potential mugging interaction event has occurred if the two or more people tracked are within a predefined proximity threshold relative to each other and a speed profile pattern associated with at least one of the people tracked indicates an increase of travel speed above a predetermined speed threshold after a relatively short duration speed slow down within the predefined proximity threshold.

* * * * *